Dec. 30, 1952 E. C. SASSE 2,623,416
APPARATUS FOR SERRATING KNIFE EDGES
Filed March 4, 1950 2 SHEETS—SHEET 1

INVENTOR.
ELMER C. SASSE
BY
Hyde, Meyer, Baldwin & Doran
ATTORNEYS

Dec. 30, 1952     E. C. SASSE     2,623,416
APPARATUS FOR SERRATING KNIFE EDGES
Filed March 4, 1950     2 SHEETS—SHEET 2
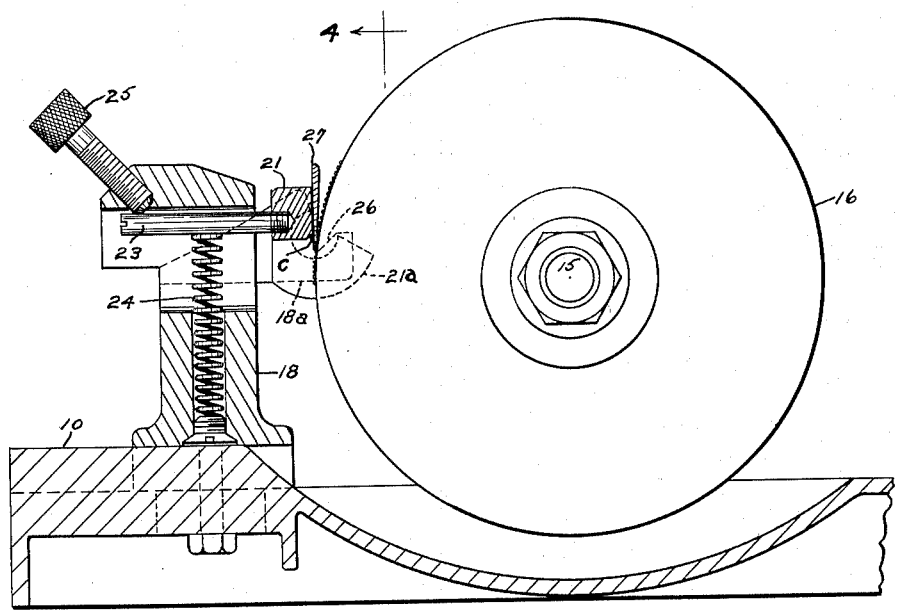
Fig. 3
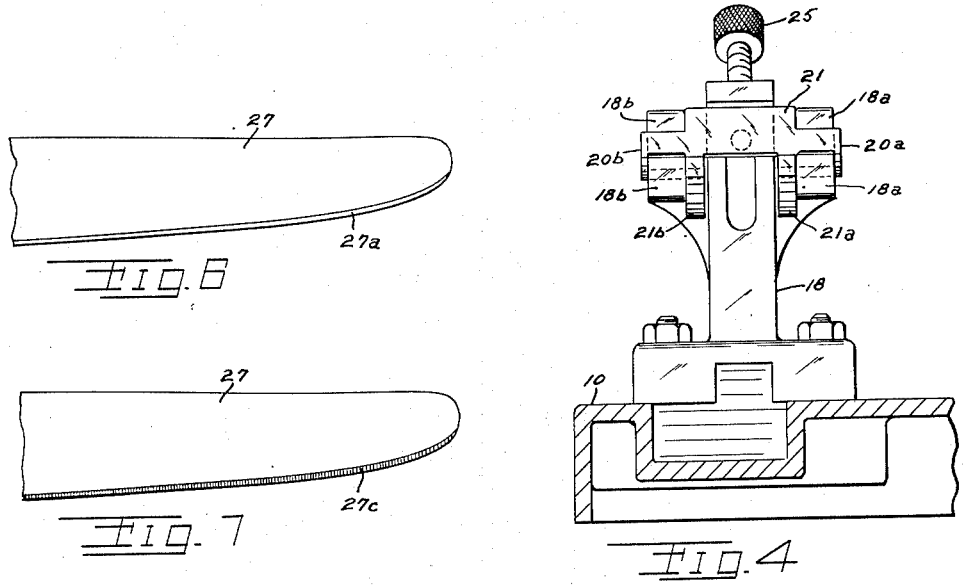
Fig. 6
Fig. 7
Fig. 4
INVENTOR.
ELMER C. SASSE
BY
Hyde, Meyer, Baldwin & Doran
ATTORNEYS Patented Dec. 30, 1952

2,623,416

UNITED STATES PATENT OFFICE 2,623,416

APPARATUS FOR SERRATING KNIFE EDGES

Elmer C. Sasse, Cleveland, Ohio

Application March 4, 1950, Serial No. 147,675

3 Claims. (Cl. 76—89.1)

The invention relates to novel and improved means for serrating the edges of cutting blades. While the invention is applicable to the serration of blades of various types, it will be illustrated and described with particular reference to an embodiment adapted for use for the serration of various types of dining room and kitchen cutlery such as table knives, steak knives, paring knives and the like.

An object of the invention is to provide novel and improved apparatus for facilitating the application of a serrated edge to a knife blade.

A further object of the invention is to provide apparatus as defined in the last preceding paragraph, and wherein novel knife holding and guiding means is provided for holding blades of varying lengths and thicknesses in serrating relationship to the cutting means.

A further object of the invention is to provide novel and improved rotary cutting means for use in the apparatus above defined.

A further object of the invention is to provide novel and improved knife positioning and guiding means which has operator operatable adjusting devices thereon for the proper accommodation of blades of different thickness, as aforesaid.

A further object of the invention is to provide a rotary cutting tool against which the knife blade is held during the serrating operation, said tool having a rotatable peripheral grooved serrating surface the number and angularity of the cutting grooves bearing to each other, and to the plane of tool rotation, certain angular and arithmetical relations which combine to facilitate the serrating operation and to provide improved results.

Other objects and advantages will be apparent from a study of the following specification, in conjunction with the accompanying drawings, in which:

Fig. 4 is a sectional view taken on the line 4—4 of Fig. 3.

Fig. 5 is an enlarged view, in planar projection, of the peripheral edge of a rotary cutting tool shown in the other drawings.

Figs. 6 and 7 show fragmentary views, respectively, of a beveled blade portion of a table knife, and the same blade portion after serration thereof.

Figure 1:
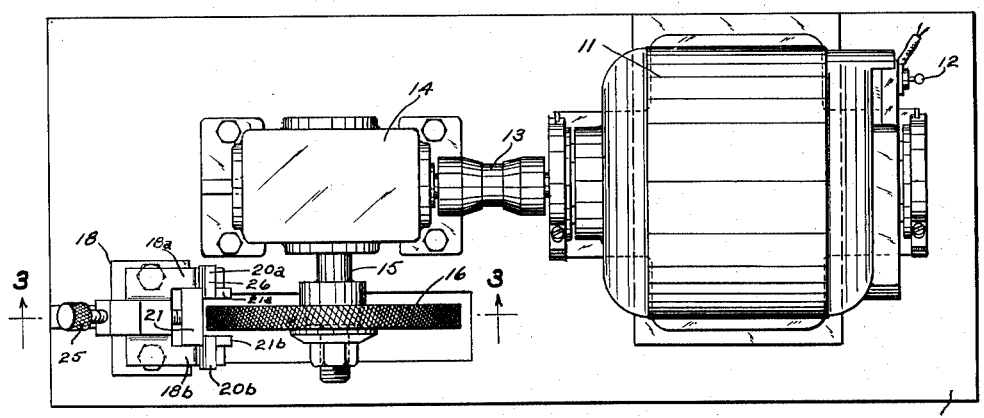
Fig. 1 is a top plan view of apparatus embodying my invention.

As is well known, a cutting blade such as a kitchen utensil cuts much more readily when serrated. Restaurants, hotels, and public and private eating places are expected to provide knives which will cut food easily and rapidly since this produces a favorable effect on the diner. In such instances the management from time to time requires that the table knives be sharpened, and frequently desires to have them serrated in addition to sharpening. The devices heretofore available for serrating cutting blades have either been solely manually operatable, with considerable time loss and variation in the quality of the product, or have been complicated and expensive mechanical set-ups wherein the knife blade is clamped in place, various adjustments are made, and a mechanical device produces relative translatory movement between the blade and the serrating means.

Speaking first generally, I have produced a relatively simple mechanism wherein a serrating tool of disc-like character rotates on a fixed axis adjacent knife guiding means; manual movement of the knife blade in one direction relative to the serrating tool produces a sharpened bevel along the working edge of the knife; thereafter the beveled edge of the knife is placed in free floating contact with the serrating tool, such contact producing knife movement in a direction opposite to the first said movement, as a result of the novel surface configuration of the serrating tool, while at the same time the rotation of the serrating tool produces a serrated edge on the knife.

It requires only a fraction of a minute to sharpen and serrate one knife blade, the blade being held relatively loosely in the operator's hand, and not being clamped in a jig or holder. The particular novel features of the invention herein claimed are the structure and operation of the blade guide, or track in which the blade is moved, and the structure and operation of the serrating tool.

Referring now to the drawings, the apparatus is fixedly supported on a base or table top 10, and is driven by an electric motor 11 of the "squirrel cage" type. When the motor is energized by operation of a starting switch 12 it transmits driving torque through a coupling 13 to a speed reduction gearing 14, and thence through a cross shaft 15 to a serrating disc or tool 16, the edge of which is grooved in an individual and novel manner to produce the effects hereinbefore described. This tool will be more fully described below. The tool is attached to shaft 15 in conventional manner so as to rotate with the shaft at predetermined speed. The speed reduction gearing and wheel are supported on a bracket 17 attached to base 10.

Figure 2:
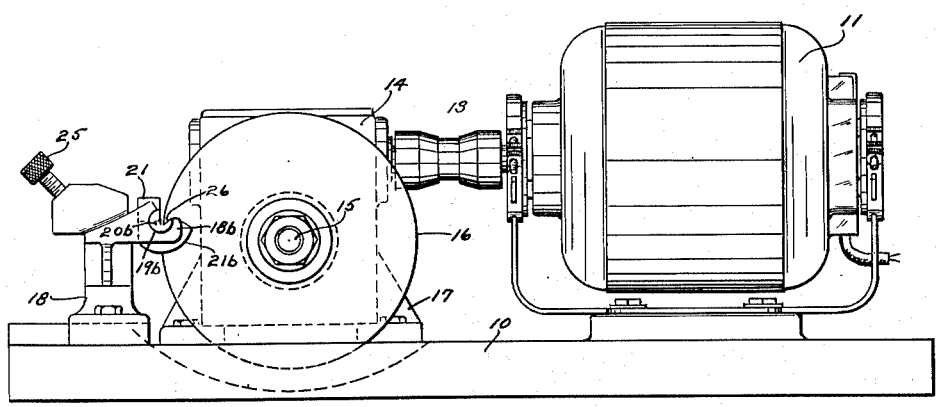
Fig. 2 is a side elevational view of the apparatus shown in Fig. 1.
Figure 3:
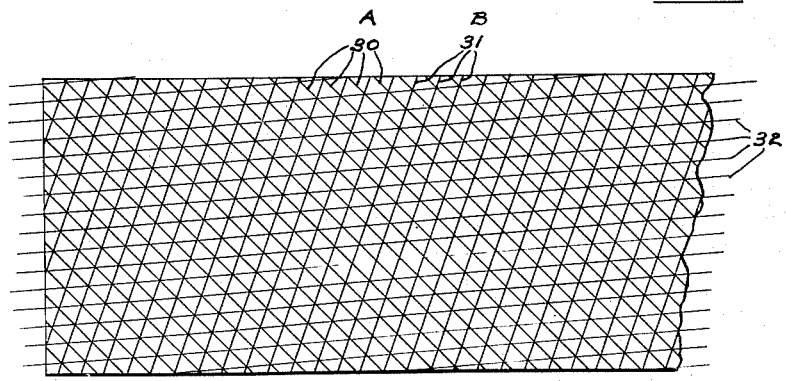
Fig. 3 is a sectional view taken on the line 3—3 of Fig. 1.

Also fixed to the base adjacent to the rotatable tool 16 is a knife guide support 18 (Figs. 2 and 3) having a pair of extending arms 18a, 18b which straddle the edge of tool 16 with working clearances. Said arms have a pair of aligned journal bores 19a, 19b for the support of stub shafts 20a and 20b which extend in opposed directions from a swingable cradle 21. The cradle has a rearwardly extending portion here consisting of a pin 23 threaded into fixed engagement with the cradle, and upwardly biased by a helical compression spring 24 the ends of which respectively abut the base 10 and the pin 23, thereby urging the rear end of the pin upwards (Fig. 3) so as to tend to swing the cradle clockwise. Angular adjustment of the cradle is secured by means of an adjusting stud 25 threaded through the upper portion of support 18, and abutting the upper rear portion of pin 23, as best seen in Fig. 3. It will be obvious that advance of stud 25 forcibly swings pin 23 downward against the bias of spring 24 whereby a preadjustable point in the range of angular movement of the pin may be fixed at any desired position by means of stud 25, and consequently the angular position of the cradle may be preset. The significance of the cradle position will immediately appear.

The cradle 21 has right and left stub shafts 20a and 20b as aforesaid (Fig. 4). In the upper surfaces of shafts 20a and 20b I provide a downwardly convergent groove 26 substantially tangential to the edge of circular tool 16, but of course subject to angular adjustment with the cradle. The center of rotation of the stub shafts, and of the lugs 21a and 21b which carry the shafts, may be regarded as the point C in Fig. 3, and is so disposed relative to the bottom of the groove 26 that swing of the cradle 21 around center C opens or closes the space between the periphery of tool 16 and the plane of the rear walls of the groove. In Fig. 3 I have shown a knife blade 27 disposed edge downwardly in the groove 26, but the angular position of the cradle is such that tool 16 blocks the bottom of the groove, and a knife blade inserted downwardly as shown makes contact on its left face with the rear edge of the groove and on its right face with the periphery of the tool. Further clockwise swing of cradle 21, by slacking off on stud 25, would change the angle of the rear face of the groove with respect to the tool for a knife blade of greater thickness. Normally a batch of knives will contain a large number of uniform thickness so that frequent adjustment will not be necessary.

The rotary serrating wheel or tool 16 will now be described. The periphery of the tool is provided with two distinct series of grooves, all the members of each series being parallel, but the two series mutually intersecting each other so that the components of each series bear different angular relationships to the peripheral edges of the tool. An attempt has been made in Fig. 5 to depict a planar projection of the tool edge, such as would appear for example if the tool were rolled on impressionable wax.

The lines 30 represent the parallel crests between the grooves of a series A. The lines 31 represent the parallel crests between grooves of a series B. The series A grooves in a preferred embodiment are at an angle of 40 to 45 degrees to the disc edges. The series B grooves are at an angle of 20 to 25 degrees to the disc edges. The series B grooves in the preferred embodiment are somewhat deeper than the series A. In addition adjacent grooves of the series A are somewhat differently spaced than those of the series B. In the aforesaid preferred embodiment the spacing of series A grooves is 30 to the inch, and the spacing of series B grooves is 32 to the inch. The showing in Fig. 5 is diagrammatic, and not necessarily conforming to these figures. A preferred spacing for both series lies between 30 and 36 grooves per inch, with the grooves of one series differing from those of the other series by not more than two grooves per inch.

As a result of the intersecting grooves the contour of the surface consists of a regular pattern of four sided pyramids. Further, as a result of the unmatched spacing of the grooves of series A and series B any repeated points in the pattern such as the apexes of the pyramidal teeth, will be arranged in lines, indicated by the reference characters 32 in Fig. 5, which will be seen to be inclined in a repeated segmental helical path, beginning at one peripheral edge and progressing in multiple screw thread fashion toward the other peripheral edge. This effect is here termed the "lead" of the cutting face.

Assume for example that an object is frictionally held against the periphery of tool 16 while the tool is being rotated, the effect of the "lead" above discussed is to move the object laterally across the tool in the direction indicated by lines 32. I have discovered that if a sharpened but not serrated knife blade such as shown in Fig. 6, the blade being beveled as at 27a, is placed in the position shown in Fig. 3, with its beveled position in contact with the tool periphery, the knife blade will simultaneously be serrated, as shown at 27c in Fig. 7, and moved laterally so that when it has been properly serrated it will have been moved out of working contact with the tool. The direction of movement of the knife will depend on the inclination of the "lead" and the direction of rotation of the tool. This simultaneous serrating and lateral moving of the knife blade occurs only when the cutting grooves bear to each other the angular and arithmetical relationships previously described.

While the cutting blade can be sharpened elsewhere, or by other means, I have found that a particularly suitable bevel 27a is formed by first inserting the knife as shown in Fig. 3, and intentionally moving it in a direction opposed to the natural direction as influenced by advance of the lead.

Putting it in another way, to bevel the blade it is moved against the lead. To then serrate the blade it is allowed to move naturally with the lead.

The apparatus I have just described is simple to construct and operate. The thickness of the blade, and the type of bevel and serration can be determined, within practical working limits, by adjustment of the screw 25, thereby swinging the cradle to provide the desired angular relationship between the rear wall of groove 26 and the rotary cutting tool.

To insure a convenient rate of lateral movement of the blade across the cylindrical serrating periphery of the cutting wheel, having due regard for the progression of the lead, the wheel should be rotated at a speed between 40 and 70 revolutions per minute for a cutting wheel diameter of about 6 inches.

What I claim is:

1. A blade serrating apparatus of the character described comprising a rotatable serrating tool having a cylindrical peripheral face concentric with the axis of rotation, means for rotating said tool, holding means for holding a blade to be serrated, said holding means having an abutment portion in a plane adjacent said face and, when in working position, substantially tangential to said face whereby said blade may be inserted, cutting edge first, in the incident angular space between said face and said abutment, said face being provided with serrating means consisting of a pattern of intersecting grooves, said pattern providing a plurality of identical projections in multiple recurrence in helical paths around said face whereby, when said blade is held with one side thereof in contact with said abutment, and with one side of the cutting edge in contact with said face while the tool is rotating, said blade will be serrated while at the same time the blade will be laterally moved across said face by frictional contact therewith.

2. Apparatus as defined in claim 1 and wherein said pattern consists of two series of grooves, a first such series having its component grooves parallel to each other and disposed at an angle of between 40 degrees and 45 degrees to the peripheral tool edges, and a second such series intersecting the grooves of the first said series, the grooves of the second said series being parallel to each other and being disposed at an angle of between 20 degrees and 25 degrees to the peripheral tool edges.

3. A blade serrating apparatus of the character described comprising a rotatable serrating disk having a cylindrical peripheral face, means for rotating said tool on a fixed axis, means for positioning a blade to be serrated, said positioning means including a cradle having therein convergent walls constituting a groove substantially parallel to said fixed axis, said cradle being rotatable on another axis likewise substantially parallel to said fixed axis, a rear wall of said groove being swingable with said cradle to carry different portions of said rear wall into or out of juxtaposition with said face, whereby said blade may be inserted, cutting edge first, into the angular space between said rear wall and said face, said face being provided with serrating means including a pattern of intersecting grooves, said pattern consisting of two series of grooves, a first such series having its component grooves parallel to each other and disposed at an angle between 40 degrees and 45 degrees to the peripheral disk edges, and a second such series intersecting the grooves of the first said series, the grooves of the second said series being parallel to each other and being disposed at an angle of between 20 degrees and 25 degrees to the peripheral disk edges, and means for varying the angular disposition of said cradle with respect to the peripheral face of said disk.

ELMER C. SASSE.

REFERENCES CITED

The following references are of record in the file of this patent:

UNITED STATES PATENTS

| Number | Name | Date |
|---|---|---|
| 133,793 | Nes | Dec. 10, 1872 |
| 343,852 | Reinhold | June 15, 1886 |
| 442,788 | Visscher | Dec. 16, 1890 |
| 648,090 | Thompson | Apr. 24, 1900 |
| 1,435,514 | Burns | Nov. 14, 1922 |
| 2,068,622 | Ufer | Jan. 19, 1937 |
| 2,070,730 | Hellstrom | Feb. 16, 1937 |
| 2,455,348 | Barstow | Dec. 7, 1948 |